United States Patent
Salimans et al.

(10) Patent No.: US 12,073,819 B2
(45) Date of Patent: Aug. 27, 2024

(54) TRAINING SPEECH SYNTHESIS NEURAL NETWORKS USING ENERGY SCORES

(71) Applicant: Google LLC, Mountain View, CA (US)

(72) Inventors: Tim Salimans, Utrecht (NL); Alexey Alexeevich Gritsenko, Amsterdam (NL)

(73) Assignee: Google LLC, Mountain View, CA (US)

( * ) Notice: Subject to any disclaimer, the term of this patent is extended or adjusted under 35 U.S.C. 154(b) by 573 days.

(21) Appl. No.: 17/339,870

(22) Filed: Jun. 4, 2021

(65) Prior Publication Data

US 2021/0383790 A1      Dec. 9, 2021

Related U.S. Application Data

(60) Provisional application No. 63/035,553, filed on Jun. 5, 2020.

(51) Int. Cl.
| | |
|---|---|
| *G10L 13/047* | (2013.01) |
| *G06N 3/08* | (2023.01) |
| *G10L 13/08* | (2013.01) |
| *G10L 25/18* | (2013.01) |
| *G10L 25/21* | (2013.01) |
| *G10L 25/30* | (2013.01) |
| *G10L 25/51* | (2013.01) |

(52) U.S. Cl.
CPC .............. *G10L 13/047* (2013.01); *G06N 3/08* (2013.01); *G10L 13/08* (2013.01); *G10L 25/18* (2013.01); *G10L 25/21* (2013.01); *G10L 25/30* (2013.01); *G10L 25/51* (2013.01)

(58) Field of Classification Search
CPC ....... G10L 13/047; G10L 25/21; G10L 13/08; G10L 25/30; G10L 25/18; G06N 3/08
See application file for complete search history.

(56) References Cited

U.S. PATENT DOCUMENTS

| | | | | |
|---|---|---|---|---|
| 5,694,474 A | * | 12/1997 | Ngo | H04B 3/20 381/66 |
| 2012/0143611 A1 | | 6/2012 | Qian et al. | |
| 2016/0140953 A1 | | 5/2016 | Kwon | |
| 2018/0075343 A1 | * | 3/2018 | van den Oord | G06N 3/04 |
| 2018/0233127 A1 | * | 8/2018 | Visser | G10L 13/027 |
| 2018/0268806 A1 | | 9/2018 | Chun et al. | |

(Continued)

FOREIGN PATENT DOCUMENTS

| | | |
|---|---|---|
| CN | 107301859 | 10/2017 |
| CN | 107516511 | 12/2017 |

(Continued)

OTHER PUBLICATIONS

Amodei et al., "Deep speech 2: End-to-end speech recognition in English and mandarin," 33rd International Conference on Machine Learning, New York City, New York, USA, Jun. 19-24, 2016, Jun. 2016, 10 pages.

(Continued)

*Primary Examiner* — Richemond Dorvil
*Assistant Examiner* — Ethan Daniel Kim
(74) *Attorney, Agent, or Firm* — Fish & Richardson P.C.

(57) ABSTRACT

Methods, systems, and apparatus, including computer programs encoded on computer storage media, for training a generative neural network to convert conditioning text inputs to audio outputs using energy scores.

24 Claims, 3 Drawing Sheets

(56) References Cited

U.S. PATENT DOCUMENTS

| | | | | |
|---|---|---|---|---|
| 2018/0293988 | A1* | 10/2018 | Huang | G10L 17/12 |
| 2019/0318754 | A1 | 10/2019 | Roux et al. | |
| 2020/0169591 | A1 | 5/2020 | Ingel et al. | |
| 2021/0136510 | A1* | 5/2021 | Tang | H04S 7/00 |
| 2021/0142815 | A1* | 5/2021 | Bryan | G10L 21/02 |

FOREIGN PATENT DOCUMENTS

| | | |
|---|---|---|
| CN | 107967916 | 4/2018 |
| CN | 108573693 | 9/2018 |
| CN | 109087669 | 12/2018 |
| CN | 109635274 | 4/2019 |
| CN | 109840287 | 6/2019 |
| CN | 110085210 | 8/2019 |
| CN | 111048062 | 4/2020 |
| JP | 2006189554 | 7/2006 |
| KR | 20190135853 | 12/2019 |

OTHER PUBLICATIONS

Arjovsky et al., "Wasserstein generative adversarial networks," 34th International Conference on Machine Learning, Sydney, Australia, Aug. 6-11, 2017, Jul. 2017, 10 pages.
Bińkowski et al., "High fidelity speech synthesis with adversarial networks," arXiv, Sep. 2019, 15 pages.
Black et al., "Statistical parametric speech synthesis," 2007 IEEE International Conference on Acoustics, Speech and Signal Processing, Honolulu, Hawaii, USA, Apr. 15-20, 2007, Apr. 2007, 4 pages.
Bouchacourt et al., "Disco nets: Dissimilarity coefficient networks," arXiv, Jun. 2016, 9 pages.
Brock et al., "Large scale GAN training for high fidelity natural image synthesis," arXiv, Sep. 2018, 35 pages.
Chen et al., "On self-modulation for generative adversarial networks," arXiv, Oct. 2018, 18 pages.
Dhariwal et al., "Jukebox: A generative model for music," arXiv, Apr. 2020, 20 pages.
Dinh et al., "Density estimation using real nvp" arXiv, May 2016, 32 pages.
Dinh et al., "Nice: Non-linear independent components estimation," arXiv, Oct. 2014, 13 pages.
Dziugaite et al., "Training generative neural networks via maximum mean discrepancy optimization" arXiv, May 2015, 10 pages.
Engel et al., "Ddsp: Differentiable digital signal processing, " arXiv, Jan. 2020, 19 pages.
Gneiting et al., "Strictly proper scoring rules, prediction, and estimation," Journal of the American Statistical Association, Mar. 2007, 21 pages.
Goodfellow et al., "Generative adversarial networks," arXiv, Jun. 2014, 9 pages.
Gretton et al., "A kernel two-sample test," The Journal of Machine Learning Research, Mar. 2012, 51 pages.
He et al., "Deep residual learning for image recognition," 2016 IEEE Conference on Computer Vision and Pattern Recognition, Las Vegas, Nevada, USA, Jun. 27-30, 2016, Jun. 2016, 9 pages.
Heusel et al., "Gans trained by a two time-scale update rule converge to a local nash equilibrium," arXiv, Jun. 2017, 38 pages.
Ioffe et al., "Batch normalization: Accelerating deep network training by reducing internal covariate shift," 32nd International Conference on Machine Learning, Lille, France, Jul. 6-11, 2015, Jun. 2015, 9 pages.
Kalchbrenner et al., "Efficient neural audio synthesis," 35th International Conference on Machine Learning, Stockholm, Sweden, Jul. 10-15, 2018, Jul. 2018, 10 pages.
Kim et al., "FloWaveNet: A generative flow for raw audio," arXiv, Nov. 2018, 9 pages.
Kingma et al., "Adam: A method for stochastic optimization," arXiv, Dec. 2014, 15 pages.
Kingma et al., "Glow: Generative flow with invertible 1x1 convolutions," arXiv, Jul. 2018, 15 pages.
Kingma et al., "Improved variational inference with inverse autoregressive flow," arXiv, Jun. 2016, 16 pages.
Kingsbury et al., "Robust speech recognition using the modulation spectrogram," Speech Communication, Aug. 1998, 16 pages.
Kuchaiev et al., "Openseq2seq: extensible toolkit for distributed and mixed precision training of sequence-to-sequence models," Proceedings of Workshop for NLP Open Source Software, Jul. 19-20, 2018, Jul. 2018, 6 pages.
Kumar et al., "Melgan: Generative adversarial networks for conditional waveform synthesis," arXiv, Oct. 2019, 14 pages.
Li et al., "Generative moment matching networks," 32nd International Conference on Machine Learning, Lille, France, Jul. 6-11, 2015, Jun. 2015, 10 pages.
Lim et al., "Geometric gan," arXiv, May 2017, 17 pages.
Lucic et al., "Are gans created equal? a large-scale study," arXiv, Nov. 2017, 21 pages.
Miyato et al., "cGANs with projection discriminator," arXiv, Feb. 2018, 21 pages.
Neekhara et al., "Expediting TTS synthesis with adversarial vocoding," arXiv, Apr. 2019, 5 pages.
Oord et al., "Parallel wavenet: Fast high-fidelity speech synthesis," 35th International Conference on Machine Learning, Stockholm, Sweden, Jul. 10-15, 2018, Jul. 2018, 9 pages.
Oord et al., "Wavenet: A generative model for raw audio," arXiv, Sep. 2016, 15 pages.
Ping et al., "Clarinet: Parallel wave generation in end-to-end text-to-speech," arXiv, Jul. 2018, 16 pages.
Ping et al., "Deep voice 3: Scaling text-to-speech with convolutional sequence learning," arXiv, Oct. 2017, 16 pages.
Prenger et al., "Waveglow: A flow-based generative network for speech synthesis," 2019 IEEE International Conference on Acoustics, Speech, and Signal Processing, Brighton, United Kingdom, May 12-17, May 2019, 5 pages.
Rezende et al., "Variational inference with normalizing flows," 32nd International Conference on Machine Learning, Lille, France, Jul. 6-11, 2015, Jun. 2015, 9 pages.
Salimans et al., "Improving GANs using optimal transport," arXiv, Mar. 2018, 13 pages.
Saxe et al., "Exact solutions to the nonlinear dynamics of learning in deep linear neural networks," arXiv, Dec. 2013, 22 pages.
Sejdinovic et al., "Equivalence of distance-based and RKHS-based statistics in hypothesis testing," The Annals of Statistics, Oct. 2013, 29 pages.
Shen et al., "Natural TTS synthesis by conditioning WaveNet on mel spectrogram predictions," 2018 IEEE International Conference on Acoustics, Speech, and Signal Processing, Calgary, AB, Canada, Apr. 15-20, 2018, Apr. 2018, 5 pages.
Shen et al., "The exact equivalence of distance and kernel methods in hypothesis testing," AStA Advances in Statistical Analysis, Sep. 2020, 33 pages.
Singh et al., "Filter response normalization layer: Eliminating batch dependence in the training of deep neural networks," 2020 IEEE/CVF Conference on Computer Vision and Pattern Recognition, Seattle, Washington, USA, Jun. 16-18, 2020, 10 pages.
Song et al., "Nonlinear equation solving: A faster alternative to feedforward computation," arXiv, Feb. 2020, 12 pages.
Szegedy et al., "Rethinking the inception architecture for computer vision," 2016 IEEE Conference on Computer Vision and Pattern Recognition, Las Vegas, Nevada, USA, Jun. 27-30, 2016, 2016, 9 pages.
Vasquez et al., "MelNet: A generative model for audio in the frequency domain," arXiv, Jun. 2019, 14 pages.
Wang et al., "Neural source-filter-based waveform model for statistical parametric speech synthesis," 2019 IEEE International Conference on Acoustics, Speech, and Signal Processing, Brighton, United Kingdom, May 12-17, May 2019, 11 pages.
Wiggers et al., "Predictive sampling with forecasting autoregressive models," 38th International Conference on Machine Learning, Vienna, Austria, Jul. 12-18, 2020, Nov. 2020, 10 pages.
Yamamoto et al., "Parallel WaveGAN: A fast waveform generation model based on generative adversarial networks with multi-

(56) References Cited

OTHER PUBLICATIONS resolution spectrogram," 2020 IEEE International Conference on Acoustics, Speech and Signal Processing, Barcelona, Spain, May 4-8, 2020, May 2020, 5 pages.

Gritsenko et al., "A spectral energy distance for parallel speech synthesis," Neural Information Processing Systems (NeurIPS 2020), Aug. 3, 2020, 11 pages.

Office Action in Chinese Appln. No. 202110631060.3, dated Apr. 7, 2024, 20 pages.

Reddy et al., "Two-stage intonation modeling using feedforward neural networks for syllable based text-to-speech synthesis," Computer Speech & Language, Aug. 2013, pp. 1105-1126.

Wang et al., "An end-to-end Chinese speech synthesis scheme based on Tacotron 2," Journal of East China Normal University, Jul. 25, 2019, pp. 111-119 (with English abstract).

\* cited by examiner

TRAINING SPEECH SYNTHESIS NEURAL NETWORKS USING ENERGY SCORES

CROSS-REFERENCE TO RELATED APPLICATION

This application claims priority to U.S. Provisional Application No. 63/035,553, filed on Jun. 5, 2020. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to one or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that trains a neural network configured to generate output audio data.

In some implementations, the output audio data is an output audio example that includes a sample of an audio wave at each of a sequence of output time steps. The audio sample at a given time step can be an amplitude value of the audio wave or a compressed or companded amplitude value.

In some other implementations, the output audio data is a spectrogram that represents an audio example. In these implementations, at inference, the system can process the generated spectrogram to generate a corresponding audio example. For example, the system can linearly project the generated spectrogram to a waveform space by applying an inverse spectrogram transformation to the generated spectrogram.

The subject matter described in this specification can be implemented in particular embodiments so as to realize one or more of the following advantages.

Some existing speech synthesis systems rely on adversarial training, i.e., training systems train the speech synthesis neural network and one or more discriminators in parallel. These generative adversarial networks can be difficult to train, and take many training epochs to converge. Using energy scores to determine parameter updates, as described in this specification, allows a system to achieve stable training and rapid convergence.

A feedforward generative neural network as described in this specification can generate output examples faster than existing techniques that rely on autoregressive generative neural networks, e.g., WaveNet, which is important for applications where fast batched inference is important. Autoregressive neural networks generate output examples across multiple output time steps by performing a forward pass at each output time step. At a given output time step, the autoregressive neural network generates a new output sample to be included in the output example conditioned on the output samples that have already been generated. This can consume a large amount of computational resources and take a large amount of time. A feedforward generative neural network, on the other hand, can generate output examples in a single forward pass while maintaining a high degree of quality of the generated output examples. This greatly reduces the time and amount of computational resources required to generate the output example relative to how much time is consumed by an autoregressive neural network.

Other existing techniques rely on invertible feedforward neural networks that are trained by distilling an autoregressive model using probability density, e.g., Parallel WaveNet. Training in this way allows the invertible feedforward neural networks to generate speech signals that sound realistic and correspond to input text without having to model every possible variation that occurs in the data. A feedforward generative neural network as described in this specification can also generate realistic audio samples that adhere faithfully to input text without having to explicitly model the data distribution of the audio data, but can do so more efficiently in terms of both model size and training time, and do not require the distillation and invertibility requirements of invertible feedforward neural networks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that trains a generative neural network to generate output audio data using conditioning text inputs. The system can train the generative neural network using energy scores, as will be described in more detail below.

Figure 1:
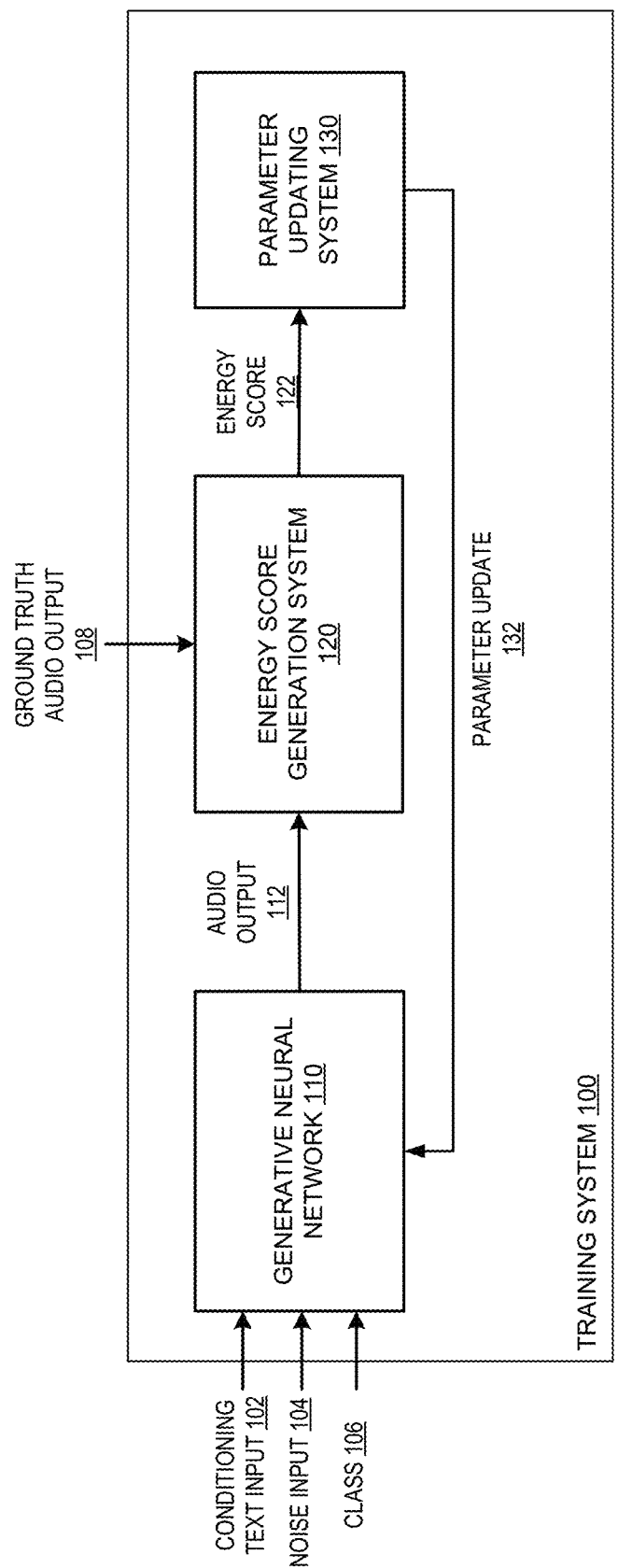
FIG. 1 is a diagram of an example training system for training a generative neural network.

FIG. 1 is a diagram of an example training system 100 for training a generative neural network 110. The training system 100 is an example of a system implemented as computer programs on one or more computers in one or more locations, in which the systems, components, and techniques described below can be implemented.

The training system 100 includes a generative neural network 110, an energy score generation system 120 and a parameter updating system 130.

The training system 100 is configured to train the generative neural network 110 to receive a conditioning text input 102 and to process the conditioning text input 102 to generate an audio output 112. In some implementations, the generative neural network 110 is a feedforward neural network, i.e., the generative neural network 110 generates the audio output 112 in a single forward pass.

The conditioning text input 102 characterizes an input text, and the audio output 112 depicts speech corresponding to the input text.

In some implementations, the conditioning text input 102 includes the input text itself, e.g., character-level or word-level embeddings of the input text. Instead or in addition, the conditioning text input can include linguistic features characterizing the text input. For example, the conditioning text input can include a respective vector of linguistic features for each input time step in a sequence of input time steps. As a particular example, the linguistic features for each input time step can include i) a phoneme and ii) a duration of the text at the input time step. The linguistic features can also include pitch information; for example, the pitch can be represented by a logarithmic fundamental frequency log $F_0$ of the input time step.

The generative neural network 110 also receives as input a noise input 104.

For example, the noise input 104 can be randomly sampled from a predetermined distribution, e.g., a normal distribution. The noise input 104 can ensure variability in the audio output 112.

In some implementations, the generative neural network 110 can also receive as input an identification of a class 106 to which the audio output 112 should belong. The class 106 can be a member of a set of possible classes. For example, the class 106 can correspond to a particular speaker that the audio output 112 should sound like. That is, the audio output 112 can depict the particular speaker speaking the input text.

Generally, the audio output 112 (also referred to as "output audio data") characterizes audio, i.e., speech, in which the input text characterize by the conditioning text input 102 is being spoken by a speaker.

In some implementations, the output audio data 112 is an output audio example that includes an audio sample of an audio wave at each of a sequence of output time steps. The audio sample at a given output time step can be an amplitude value of the audio wave or a compressed or companded amplitude value.

In some other implementations, the output audio data 112 is data defining a spectrogram that represents an audio example, i.e., data specifying the magnitude component of a short-time Fourier transform (STFT) applied to the audio example.

In these implementations, at inference, the system 100 can process the generated spectrogram to generate a corresponding audio example. For example, the system can generate an audio example by linearly projecting the generated spectrogram to a waveform space by applying an inverse spectrogram transformation to the generated spectrogram.

The generative neural network 110 can have any appropriate neural network architecture.

As a particular example, the generative neural network 110 can include a sequence of groups of convolutional neural network layers, called "generator blocks." The first generator block in the sequence of generator blocks can receive as input the conditioning text input (or an embedding of the conditioning text input) and generate a block output. Each subsequent generator block in the sequence of generator blocks can receive as input the block output generated by the previous generator block in the sequence of generator blocks and generate a subsequent block output.

Example architectures of the generative neural network 110 will be described in more detail below with reference to FIG. 2.

To train the generative neural network 110, the system 100 repeatedly updates the values of the parameters of the neural network 110 using mini-batches of training examples sampled from a set of training data.

Each mini-batch includes one or more training examples that each, in turn, include a training conditioning text input 102 and a ground-truth audio output 108.

As will be evident from the description below, the ground-truth audio output 108 can either be (i) an audio example that include a sequence of samples of audio waves and that represents the input text characterizing the training conditioning text input 102 being spoken by a speaker or (ii) a spectrogram of the audio example that represents the input text characterizing the training conditioning text input 102 being spoken by a speaker.

During the training, the system 100 processes the conditioning text input 102 in each training example using the neural network 110 multiple times, generating a respective predicted audio output 112 each time.

In particular, the system 100 samples multiple noise inputs 104 for each training example, e.g., $z \sim N(0, I_d)$, where I is an identity matrix of size d. In some implementations, the system 100 samples noise inputs using latent variable truncation. That is, the system 100 samples an initial noise input and, for each element of the noise input that has an absolute value that exceeds a particular threshold, resamples the element to ensure that the magnitude of every element is below the particular threshold, effectively truncating the distribution to have a maximum absolute value equal to the particular threshold.

For each noise input 104, the system then processes the conditioning text input 102 and the noise input 104 using the neural network 110 to generate a respective audio output 112. Because the noise inputs 104 will generally be different because they are different samples from the same distribution, the respective audio outputs 112 will generally be different even though they are generated using the same conditioning text input 102.

The energy score generation system 120 then generates an estimated energy score 122 for each training example in the mini-batch using the multiple audio outputs 112 for the training example and the ground truth output 108 in the training example and provides the estimated energy scores 122 to the parameter updating system 130.

Generating an estimated energy score will be described in more detail below with reference to FIGS. 2 and 3.

The parameter updating system 130 can obtain the estimated energy scores 122 generated by the energy score generation system 120 and determine a parameter update 132 according to a loss function that characterizes a combined energy score across the training examples in the mini-batch, e.g., that is the sum or the average of the estimated energy scores 122. In particular, the system 130 can compute gradients with respect to the parameters of the neural network 110 of the loss function and then apply an appropriate optimizer to the gradients, e.g., an Adam optimizer, an rmsProp optimizer, an Adafactor optimizer, and SGD optimizer, and so on, to determine the parameter update 132.

In some implementations, the loss function also includes one or more other terms that are generated using other components of the system 110. For example, the loss function can also include one or more adversarial loss terms that make use of one or more discriminator neural networks that attempt to predict whether the audio outputs 112 are ground truth audio outputs from the training data or outputs that have been generated by the neural network 110.

The training system 100 can apply the parameter update 132 to the parameters of the generative neural network 110 by, e.g., adding or subtracting the update 132 from the current values of the parameters.

By repeatedly updating the parameters in this manner, the training system 100 trains the neural network 110, i.e., determines trained values of the parameters of the neural network 110, so that the neural network 110 generates output examples (or generates histograms that can be used to generate output examples) that sound realistic and accurately synthesize speech from input text.

Figure 2:
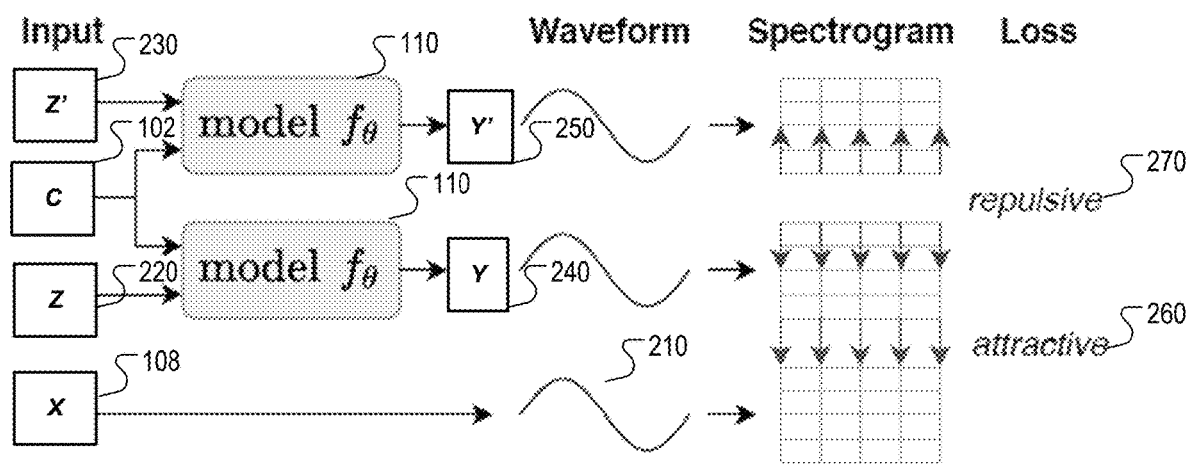
FIG. 2 is a diagram that illustrates of the training process.

FIG. 2 is a diagram 200 that illustrates the training of the neural network 110.

In particular, the diagram 200 illustrates the training of the neural network 110 ("model $f_\theta$") on a training example that includes a training conditioning text input c 102 and a ground-truth audio output x 108. In the example of FIG. 2, the ground-truth audio output x directly defines a waveform 210, i.e., is a sequence of samples of an audio wave.

In some implementations, the system samples the training example uniformly at random from the training data. In some other implementations, the system samples training examples from the training data set with a probability proportional to the length of the training example. In some implementations, the system only processes a portion of the sampled full training example; that is, the system determines the training example to be a fixed-size subsequence of a larger conditioning text input and the corresponding subsequence of the ground-truth audio output for the larger conditioning text input.

In the example of FIG. 2, the system samples two noise inputs: a first noise input z 220 and a second noise input z' 230.

The system then processes a first training generative input that includes the training conditioning text input c and the first noise input z using the neural network 110 in accordance with current values of the parameters to generate a first predicted audio output y 240 and processes a second training generative input that includes the training conditioning text input c and the second noise input z' using the neural network 110 in accordance with the current values of the parameters to generate a second predicted audio output y' 250.

In some implementations, e.g., when the audio outputs are audio examples, the neural network 110 includes multiple one-dimensional convolutional neural network layers. For example, the neural network can include one or more 'G Blocks' that each include multiple convolutional neural network layers of increasing dilation rates, as described in *High Fidelity Speech Synthesis with Adversarial Networks*, Bińkowski et al. (arXiv:1909.11646). In some implementations, each G Block includes one or more nearest-neighbor upsampling layers and one or more conditional batch normalization layers, e.g., conditional batch normalization layers that are conditioned on the sampled noise embedding.

In some implementations, the neural network includes one or more Filter Respond Normalization (FRN) layers that each receive as input a sequence $x \in \mathbb{R}^{t \times c}$ with time dimensionality t and c channels, and output a sequence $y \in \mathbb{R}^{t \times c}$ by computing:

$$y = \max\left(\gamma \frac{x}{\sqrt{v^2 + \epsilon}} + \beta, \tau\right)$$

where $$v^2 = \frac{1}{t}\sum_i x_i^2 \in \mathbb{R}^c, \gamma \in \mathbb{R}^c \text{ and } \beta \in \mathbb{R}^c$$

are learned vectors, $\epsilon$ is a positive scalar, and $\tau \in \mathbb{R}^c$ is a threshold.

In some implementations, one or more particular FRN layers are conditioned on the sampled noise input. For example, for each particular FRN layer, the parameters γ and β of the layer can be learned linear functions of the respective noise embedding, i.e., functions that are learned jointly during training of the neural network. As a particular example, for each particular FRN layer, the parameters γ and β can be determined by sampling the noise input $z \sim N(0, I_d)$ and computing $$\gamma = W_\gamma z + (b_\gamma + 1)$$

$$\beta = W_\beta z + b_\beta$$

where $W_\gamma, W_\beta \in \mathbb{R}^{d \times c}$ and $b_\gamma, b_\beta \in \mathbb{R}^c$ are specific to the particular FRN layer.

In some other implementations, e.g., when the audio outputs specify spectrograms, the neural network 110 includes a 1D convolution with kernel size 1 that is used to project the conditioning text input to respective projected vector per chunk, where each chunk corresponds to a predetermined number of input time steps. The projected vectors are then fed into a stack of bottleneck ResNet blocks. Each of the ResNet blocks consists of a kernel size 1 convolution to 512 channels, 2 convolutions of kernel size 5 at 512 channels, followed by projection to a fixed number of channels. In-between the convolution, the neural network 110 uses conditional batch normalization to condition on the noise vector and optionally on the class input.

After the ResNet blocks, the neural network 110 projects the output down to 240 dimensions per chunk. Of these dimensions, one is used to exponentially scale the remaining 239 features. These remaining 239 features (after scaling) are then interpreted as the non-redundant elements of an STFT with window size 240 and frame step 120, i.e., are the audio output that specifies the spectrogram. These 239 features can then be projected to the waveform space using a linear inverse STFT transformation to generate a waveform.

In some implementations, the neural network generates each of the multiple predicted audio outputs in parallel.

After the neural network generates the multiple different predicted audio outputs, the system can determine an estimated energy score characterizing a distance between the ground-truth audio output x and the multiple predicted audio outputs y and y'.

That is, the energy score characterizes a similarity between a goal distribution p represented by the ground-truth audio output and the estimated distribution q of the generative model of the neural network. Energy scores and examples are discussed in more detail in *Strictly Proper Scoring Rules, Prediction, and Estimation*, Gneiting et al. (DOI: 10.1198/016214506000001437).

In order to determine the estimated energy score, the system can compute, for a first predicted audio output of the multiple predicted audio outputs, i) a distance between the first predicted audio output and the ground-truth audio output, according to a distance metric; and ii) a distance between the first predicted audio output and a second predicted audio output of the multiple predicted audio outputs, according to the distance metric.

One example of an estimated energy score is $$2d(x_i, y_i) - d(y_i, y_i'),$$

where d is the distance metric, $x_i$ is the ground-truth audio output, $y_i$ is the first predicted audio output, and $y_i'$ is the second predicted audio output.

Because the estimated energy score is larger when the distance between the ground-truth output and the first predicted audio output is larger, the term that measures this distance can be referred to as an "attractive" term 260, because minimizing the loss function that is based on this estimated energy score encourages the distance between the ground truth and the first predicted audio output to be smaller.

Because the estimated energy score is smaller when the distance between the second predicted audio output and the first predicted audio output is larger, the term that measures this distance can be referred to as a "repulsive" term 270, because minimizing the loss function that is based on this estimated energy score encourages the distance between the first and second predicted outputs to be larger.

Including this repulsive term in the loss encourages diverse samples and provides a statistical consistency guarantee. In other words, the presence of the repulsive term is necessary for the loss to be a proper scoring rule for learning the conditional distribution of audio given linguistic features and prevents the generated samples from collapsing to a single point without capturing the full distribution of possible samples that can correspond to a given input text.

In some implementations, the system determines an update to the current values of the parameters of the neural network using a mini-batch of training examples by combining the respective energy score of each training example. For example, the system can compute the loss function $$L_{GED}(q) = \sum_{i=1}^{M} 2d(x_i, y_i) - d(y_i, y'_i),$$

wherein M is the number of training examples in the mini-batch.

In some implementations, the loss function also includes one or more other terms that are generated using other components of the system. For example, the loss function can also include one or more adversarial loss terms that make use of one or more discriminator neural networks that attempt to predict whether the audio outputs are ground truth audio outputs from the training data or outputs that have been generated by the neural network 110.

Generally, the distance metric is negative definite, which causes the estimated energy score to be a 'proper scoring rule,' that is, the estimated energy score will be minimized when q=p. For example, the distance metric can be of the form $d(a, b)=\|a-b\|_\alpha^\beta$. If $\alpha \in (0,2]$ and $\beta \in (0, \alpha]$, then the estimated energy score will be a proper scoring rule. Having a loss that is a proper scoring rule has been shown to lead to a statistically consistent learning method and can be calculated from mini-batches without, leading to improved training stability and a higher-quality resulting model.

In some implementations, the distance function d is a spectrogram distance function that operates on spectrograms, i.e., that measures the distance between two spectrograms.

In particular, in these implementations, the distance function measures the distance between two audio outputs as a distance between spectrograms corresponding to the two audio outputs.

When the audio outputs specify spectrograms, the spectrogram corresponding to an audio output is the spectrogram specified by the audio output.

When the audio outputs are audio examples, the spectrogram corresponding to an audio output is a spectrogram that is generated by the system from the audio output, i.e., from the audio example. That is, the system can first generate spectrograms corresponding to each predicted audio output and the ground-truth audio output and the compute the distance function on the generated spectrograms.

That is, while the example of FIG. 2 shows that the ground truth output x and the predicted outputs y and y' are waveforms that are then converted to a corresponding spectrogram, in some other examples, the ground truth outputs, the predicted outputs, or both are spectrograms and therefore do need to be converted.

The system can determine a spectrogram of an audio example using any appropriate technique. As a particular example, however, the system can determine the spectrograms using an overcomplete Fourier basis with Hann windowing.

In particular, in some implementations, the system can determine a spectrogram of an audio output x of length N by, for each spectrogram window length k, i) cropping the audio output to be length $$\left(\left\lfloor \frac{N}{k} \right\rfloor - 1\right) \cdot k$$

to generate a cropped audio output; and ii) determining a spectrogram of the cropped audio output.

The system can use any of a variety of spectrogram distance metrics to compute the distances between audio outputs.

For example, the spectrogram distance metric can be a linear combination of one or more distance functions that are each of the form $d(x_i, x_j)=\|s(x_i)-s(x_j)\|_\alpha^\beta$ or $d(x_i, x_j)=\|\log s(x_i)-\log s(x_j)\|_\alpha^\beta$, where $x_i$ is a first audio output, $x_j$ is a second audio output, and s(x) is a spectrogram of x. As described above, if $\alpha \in (0,2]$ and $\beta \in (0,\alpha]$, then the estimated energy score is a proper scoring rule.

As a particular example, the spectrogram distance metric can be $$d(x_i, x_j) = \sum_{k \in K} \sum_{t} \|s_t^k(x_i) - s_t^k(x_j)\|_1 + \alpha_k \|s_t^k(x_i) - s_t^k(x_j)\|_2$$

where k is a particular window length of the spectrograms, K is a set of the window lengths of the spectrograms, t is a time point within the spectrograms, $s_t^k(x)$ is the value of the spectrogram of audio output x at time point t with window length k, and $\alpha_k$ is a learned or predetermined weight value.

As another particular example, the spectrogram distance metric can be $$d(x_i, x_j) = \sum_{k \in K} \sum_{t} \|s_t^k(x_i) - s_t^k(x_j)\|_1 + \alpha_k \|\log s_t^k(x_i) - s_t^k(x_j)\|_2$$

where k is a particular window length of the spectrograms, K is a set of the window lengths of the spectrograms, t is a time point within the spectrograms, $s_t^k(x)$ is the value of the spectrogram of audio output x at time point t with window length k, and $\alpha_k$ is a learned or predetermined weight value.

The set of window lengths of the spectrograms K can be a geometrically-spaced sequence of window lengths, e.g., a sequence of powers of 2. As a particular example, $K=[2^6, \ldots, 2^{11}]$.

Figure 3:
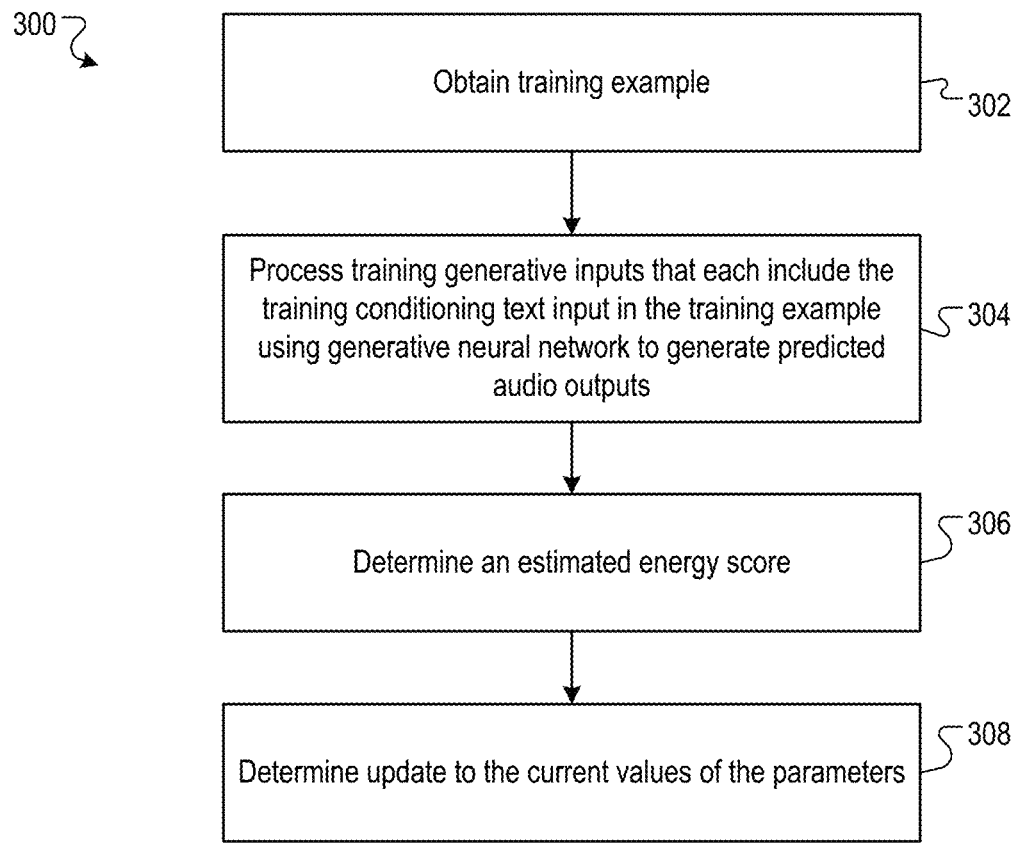
FIG. 3 is a flow diagram of an example process for training a generative neural network.

FIG. 3 is a flow diagram of an example process 300 for training a generative neural network. For convenience, the process 300 will be described as being performed by a system of one or more computers located in one or more locations. For example, a training system, e.g., the training system 100 depicted of FIG. 1, appropriately programmed in accordance with this specification, can perform the process 300.

The system obtains a training example that includes a conditioning text input and a ground-truth audio output for the training example (step 302). The training conditioning text input can include a respective linguistic feature representation at each of multiple input time steps. For example, the linguistic feature representation at each input time step can include a phoneme, a duration, and a logarithmic fundamental frequency at the time step.

The system processes multiple training generative inputs that each include the training conditioning text input in the training example using the generative neural network to generate multiple training audio outputs for the training example (step 304).

The system generates the training audio outputs in accordance with current values of the parameters of the generative neural network. Each training audio output can include a respective audio sample at each of multiple output time steps or can specify a spectrogram of an audio example.

In particular, each training generative input also includes a noise input. The system can sample multiple different noise inputs and, for each noise input, process a training generative input that includes the noise input and the training conditioning text input to generate a respective training output.

In some implementations, the generative input also includes an identification of a class to which the output wave should belong. In some such implementations, one or more of the layers of the neural network are further conditioned on the identification of the class.

The system determines an estimated energy score for the training example using the ground-truth audio output in the training example and the multiple training audio outputs for the training example (step 306). As described above, the estimated energy score characterizes a distance between the ground-truth audio output and the plurality of predicted audio outputs and is based on at least (i) a distance between a first predicted audio output of the multiple outputs and the ground-truth audio output according to a distance metric and (ii) a distance between the first predicted audio output and the second predicted audio output according to the distance metric.

The system determines an update to the current values of the parameters according to the estimated energy score (step 308). For example, the system can determine estimated energy scores for each training example in a mini-batch and then determine the update by computing a gradient of a loss function that measures a combined energy score for the training examples, e.g., a sum or average of the energy scores for the training examples. The system can then apply an optimizer to the gradient to determine the update to the current values of the parameters.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of parameters and configured to generate audio outputs that define audio examples using conditioning text inputs,
wherein the neural network is configured to receive a generative input comprising a conditioning text input and a noise input and to process the network input to generate an audio output that comprises respective audio samples at each of a plurality of output time steps, and
wherein the method comprises:
obtaining a training example comprising a training conditioning text input and a corresponding ground-truth audio output;
generating a plurality of predicted audio outputs for the training example by, for each of a plurality of noise inputs, processing a training generative input comprising the training conditioning text input and the noise input using the neural network in accordance with current values of the parameters to generate respective predicted audio output;
determining an estimated energy score characterizing a distance between the ground-truth audio output and the plurality of predicted audio outputs, comprising:
computing, for a first predicted audio output of the plurality of predicted audio outputs, a distance between the first predicted audio output and the ground-truth audio output according to a distance metric, comprising computing a distance between a spectrogram corresponding to the first predicted audio output and a spectrogram corresponding to the ground-truth audio output according to a spectrogram distance metric; and
computing, for the first predicted audio output and a second predicted audio output of the plurality of predicted audio outputs, a distance between the first predicted audio output and the second predicted audio output according to the distance metric, comprising computing a distance between a spectrogram corresponding to the first predicted audio output and a spectrogram corresponding to the second predicted audio output according to the spectrogram distance metric; and
determining an update to the current values of the parameters according to the estimated energy score.

2. The method of claim 1, wherein the estimated energy score is equal to:

$$2d(x_i, y_i) - d(y_i, y_i'),$$

where d is the distance metric, $x_i$ is the ground-truth audio output, $y_i$ is the first predicted audio output, and $y_i'$ is the second predicted audio output.

3. The method of claim 2, wherein determining an update to the current values of the parameters according to the estimated energy score comprises determining the update according to a loss function characterizing a combined energy score across a plurality of training examples, wherein the loss function is $$L_{GED}(q) = \sum_{i=1}^{M} 2d(x_i, y_i) - d(y_i, y_i'),$$

wherein M is a number of training examples.

4. The method of claim 1, wherein the distance metric is negative definite.

5. The method of claim 1, wherein the spectrogram distance metric is a linear combination of one or more distance functions that are each of the form $d(x_i, x_j) = \|s(x_i) - s(x_j)\|_\alpha^\beta$ or $d(x_i, x_j) = \|\log s(x_i) - \log s(x_j)\|_\alpha^\beta$, where $x_i$ is a first audio output, $x_j$ is a second audio output, and $s(x)$ is a spectrogram of x.

6. The method of claim 5, wherein $\alpha \in (0,2]$ and $\beta \in (0,\alpha]$.

7. The method of claim 6, wherein the spectrogram distance metric is $$d(x_i, x_j) = \sum_{k \in K} \sum_t \|s_t^k(x_i) - s_t^k(x_j)\|_1 + \alpha_k \|s_t^k(x_i) - s_t^k(x_j)\|_2$$

wherein k is a particular window length of the spectrograms, K is a set of the window lengths of the spectrograms, t is a time point of the spectrograms, $s_t^k(x)$ is the value of the spectrogram of audio output x at time point t with window length k, and $\alpha_k$ is a learned or predetermined weight value.

8. The method of claim 7, wherein K is a geometrically-spaced sequence of window lengths.

9. The method of claim 6, wherein the spectrogram distance metric is $$d(x_i, x_j) = \sum_{k \in K} \sum_t \|s_t^k(x_i) - s_t^k(x_j)\|_1 + \alpha_k \|\log s_t^k(x_i) - s_t^k(x_j)\|_2$$

wherein k is a particular window length of the spectrograms, K is a set of the window lengths of the spectrograms, t is a time point of the spectrograms, $s_t^k(x)$ is the value of the spectrogram of audio output x at time point t with window length k, and $\alpha_k$ is a learned or predetermined weight value.

10. The method of claim 1, wherein each audio output includes a respective plurality of samples of an audio wave, and wherein computing the distance between a first audio output and a second audio output comprises:
determining the respective spectrogram of each of the first and second audio outputs.

11. The method of claim 10, wherein determining the respective spectrogram of each of the first and second audio outputs comprises determining the respective spectrograms using an overcomplete Fourier basis and Hann windowing.

12. The method of claim 10, wherein determining a spectrogram of an audio output x of length N comprises, for each spectrogram window length k:
cropping the audio output to be length $$\left(\left\lfloor \frac{N}{k} \right\rfloor - 1\right) \cdot k$$

to generate a cropped audio output; and
determining a spectrogram of the cropped audio output.

13. The method of claim 1, wherein obtaining a training example comprises:

sampling a full training example from a training data set with probability proportional to a length of the full training example; and determining the training example to be a fixed-size portion of the sampled full training example.

14. The method of claim 1, wherein the neural network comprises a plurality of one-dimensional convolutional neural network layers.

15. The method of claim 1, wherein the neural network comprises one or more Filter Response Normalization layers that receive as input a sequence $x \in \mathbb{R}^{t \times c}$ and output a sequence $y \in \mathbb{R}^{t \times c}$ by computing:

$$y = \max\left(\gamma \frac{x}{\sqrt{v^2 + \epsilon}} + \beta, \tau\right)$$

where $$v^2 = \frac{1}{t}\sum_i x_i^2 \in \mathbb{R}^c, \gamma \in \mathbb{R}^c \text{ and } \beta \in \mathbb{R}^c$$

are learned vectors, $\epsilon$ is a positive scalar, and $\tau \in \mathbb{R}^c$ is a threshold.

16. The method of claim 15, wherein:
for each noise input, one or more particular Filter Response Normalization layers are conditioned on the noise input during the processing of the generative input that includes the noise input.

17. The method of claim 16, wherein, for each layer of the one or more particular Filter Response Normalization layers, the parameters $\gamma$ and $\beta$ of the layer are learned linear functions of the noise input.

18. The method of claim 17, wherein, for each layer of the one or more particular Filter Response Normalization layers, $\gamma$ and $\beta$ are determined by:
sampling the noise input $z \sim N(0, I_d)$, where I is an identity matrix of size d; and computing $\gamma = W_\gamma z + (b_\gamma + 1)$ $\beta = W_\beta z + b_\beta$ wherein $W_\gamma, W_\beta \in \mathbb{R}^{d \times c}$ and $b_\gamma, b_\beta \in \mathbb{R}^c$ are specific to the layer.

19. The method of claim 1, wherein generating the plurality of predicted audio outputs comprises generating each of the plurality of predicted audio outputs in parallel.

20. The method of claim 1, wherein each conditioning text input comprises a respective linguistic feature representation at each of a plurality of input time steps.

21. The method of claim 1, wherein generating the plurality of predicted audio outputs comprises sampling each of the noise inputs from a noise distribution.

22. The method of claim 21, wherein sampling each noise input comprises:
sampling an initial noise input;
determining that absolute values of one or more elements of the initial noise input are above a predetermined threshold; and
in response, resampling the determined one or more elements.

23. A system comprising one or more computers and one or more storage devices storing instructions that when executed by the one or more computers cause the one or more computers to perform operations for training a neural network having a plurality of parameters and configured to generate audio outputs that define audio examples using conditioning text inputs,
wherein the neural network is configured to receive a generative input comprising a conditioning text input and a noise input and to process the network input to generate an audio output that comprises respective audio samples at each of a plurality of output time steps, and
wherein the operations comprise:
obtaining a training example comprising a training conditioning text input and a corresponding ground-truth audio output;
generating a plurality of predicted audio outputs for the training example by, for each of a plurality of noise inputs, processing a training generative input comprising the training conditioning text input and the noise input using the neural network in accordance with current values of the parameters to generate respective predicted audio output;
determining an estimated energy score characterizing a distance between the ground-truth audio output and the plurality of predicted audio outputs, comprising:
computing, for a first predicted audio output of the plurality of predicted audio outputs, a distance between the first predicted audio output and the ground-truth audio output according to a distance metric, comprising computing a distance between a spectrogram corresponding to the first predicted audio output and a spectrogram corresponding to the ground-truth audio output according to a spectrogram distance metric; and
computing, for the first predicted audio output and a second predicted audio output of the plurality of predicted audio outputs, a distance between the first predicted audio output and the second predicted audio output according to the distance metric, comprising computing a distance between a spectrogram corresponding to the first predicted audio output and a spectrogram corresponding to the second predicted audio output according to the spectrogram distance metric; and
determining an update to the current values of the parameters according to the estimated energy score.

24. One or more non-transitory computer-readable storage media storing instructions that when executed by one or more computers cause the one or more computers to perform operations for training a neural network having a plurality of parameters and configured to generate audio outputs that define audio examples using conditioning text inputs,
wherein the neural network is configured to receive a generative input comprising a conditioning text input and a noise input and to process the network input to generate an audio output that comprises respective audio samples at each of a plurality of output time steps, and
wherein the operations comprise:
obtaining a training example comprising a training conditioning text input and a corresponding ground-truth audio output;
generating a plurality of predicted audio outputs for the training example by, for each of a plurality of noise inputs, processing a training generative input comprising the training conditioning text input and the noise input using the neural network in accordance with current values of the parameters to generate respective predicted audio output;

determining an estimated energy score characterizing a distance between the ground-truth audio output and the plurality of predicted audio outputs, comprising:

computing, for a first predicted audio output of the plurality of predicted audio outputs, a distance between the first predicted audio output and the ground-truth audio output according to a distance metric, comprising computing a distance between a spectrogram corresponding to the first predicted audio output and a spectrogram corresponding to the ground-truth audio output according to a spectrogram distance metric; and computing, for the first predicted audio output and a second predicted audio output of the plurality of predicted audio outputs, a distance between the first predicted audio output and the second predicted audio output according to the distance metric, comprising computing a distance between a spectrogram corresponding to the first predicted audio output and a spectrogram corresponding to the second predicted audio output according to the spectrogram distance metric; and determining an update to the current values of the parameters according to the estimated energy score.

\* \* \* \* \*